Jan. 10, 1939.   H. GILBERT   2,143,550
SIGNALING DEVICE FOR AUTOMOBILES
Filed Nov. 13, 1936
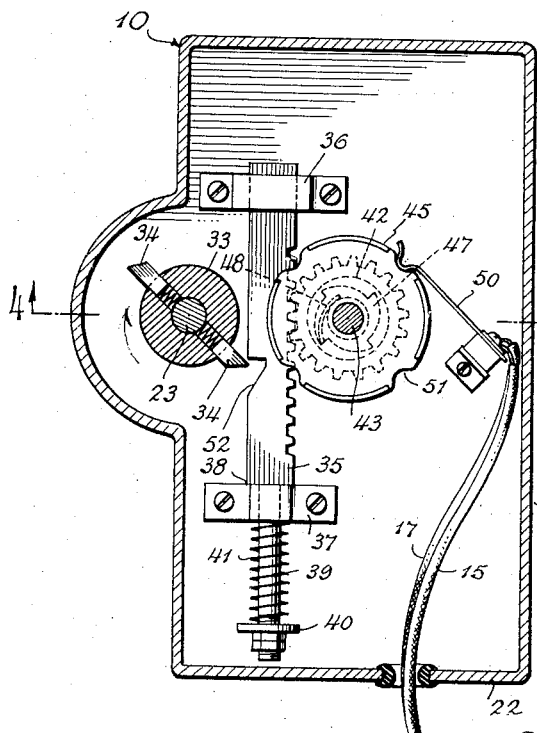
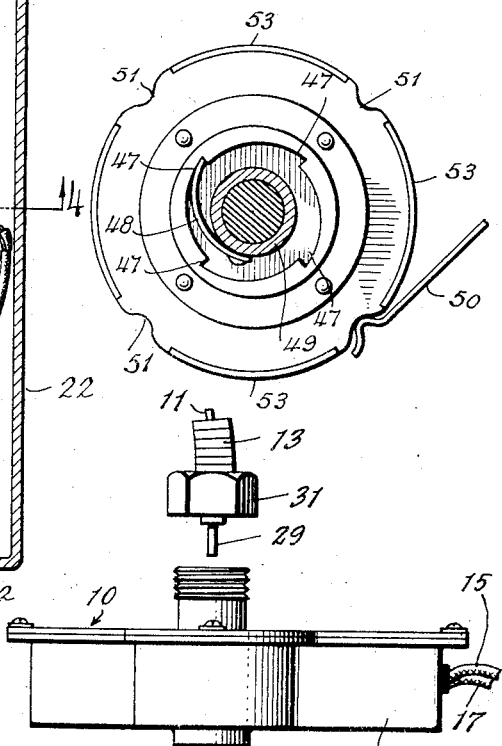
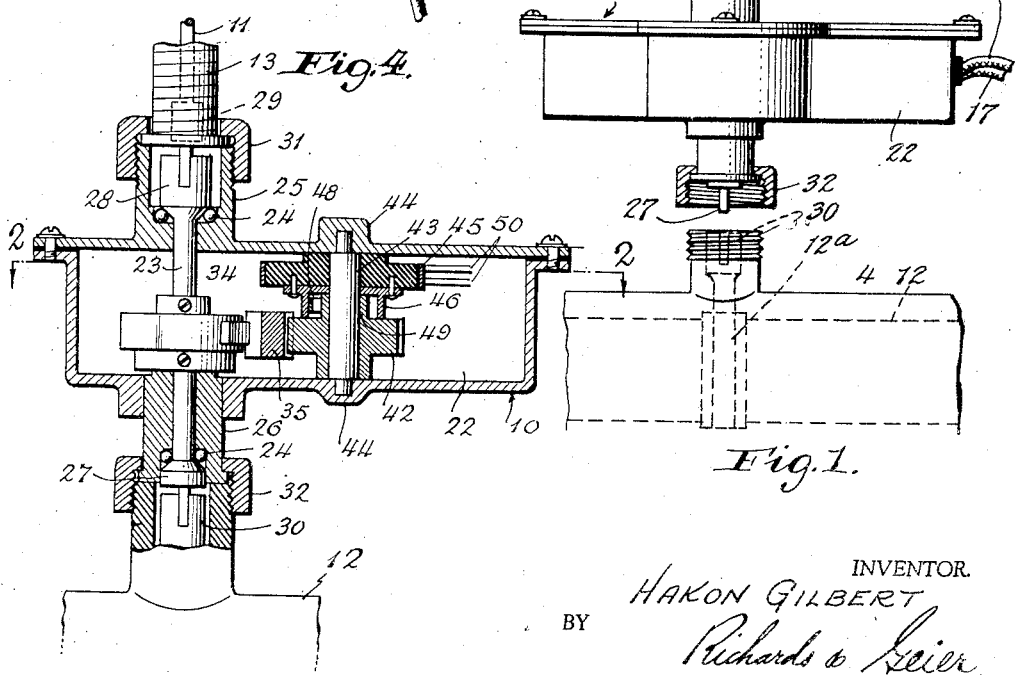
INVENTOR.
HAKON GILBERT
BY Richards & Geier
ATTORNEYS Patented Jan. 10, 1939

2,143,550

UNITED STATES PATENT OFFICE 2,143,550

SIGNALING DEVICE FOR AUTOMOBILES

Hakon Gilbert, Brooklyn, N. Y.

Application November 13, 1936, Serial No. 110,690

3 Claims. (Cl. 200—52)

This invention relates to signaling devices and particularly to a signaling device for automobiles and the like to indicate motional direction.

The main object of the invention is to provide a signaling device of simple and efficient construction which may be easily connected to the driving parts of the vehicle.

Another object is to provide a signaling device to indicate rearward motion of the vehicle which may be easily connected to the driving parts as an auxiliary device.

In carrying out the invention, a device of the nature which will hereinafter be described in detail is connected to the speedometer shaft of the vehicle and the mechanical operation of which device will impart electric impulses to an indicator device mounted on the vehicle where said impulses will be transformed into light or sound to indicate the motional direction of the vehicle.

The invention will be more clearly understood from the accompanying drawing which illustrates a preferred embodiment by way of example and in which:—

Figure 1 is a front elevational view showing the device in accordance with the invention in position to be installed.

Figure 2 is a cross section of the device along the line 2—2 of Figure 4.

Figure 3 is a cross section along the line 3—3 of Figure 4.

Figure 4 is a cross section along the line 4—4 of Figure 2.

The signal device generally indicated at 10 is inserted between parts of the speedometer shaft 11 which is geared to the drive shaft of engine 12 at 12a and connected to the speedometer (not shown in the drawing). The speedometer shaft rotates within the speedometer cable 13. The signaling device 10 is connected to the battery 14 by the wire 15 and to the indicator 16 by means of wire 17. The battery 14 is grounded at 18 and the indicator 16 is grounded at 19. Referring to Figure 1, the reference numeral 20 indicates the transmission and the numeral 21, the rear wheel of the vehicle.

The signaling mechanism to be hereinafter described in detail is enclosed within the casing 22. The shaft 23 mounted by ball bearings 24 in bosses 25 and 26 is connected to the speedometer shaft 11 by means of male and female connectors 27 and 28 and the corresponding connectors 29 and 30 of the speedometer shaft. Thus the signaling device may be inserted between the links of the speedometer shaft, and, upon removal, the links may again be easily connected.

The boss 27 is screw-threaded to engage the conventional nut 31 of the speedometer cable, and the boss 26 is provided with a nut 32 to engage the corresponding screw-threaded portion of the other link of the speedometer cable. Thus the device is held securely in place and upon removal, the links may again be connected in the conventional manner.

A disc 33 provided with spring-press pawls 34 is mounted on the shaft 23. During normal rotation of the shaft, i. e., when the vehicle moves in a forward direction, the disc 33 will rotate in the direction of the arrow in Figure 2. The spring-press pawls 34 will easily slide over the toothed rack 35 slidably mounted in bearings 36 and 37. One end of the rack 35 is provided with an abutment 38 resting against the bearing 37 during normal motion of the vehicle and the rack 35 terminates in a shaft 39 which is slidably mounted in the bearing 37 and provided with an adjustable abutment 40.

A retractile spring 41 is mounted on the shaft 39 between the abutment 40 and the bearing 37 so that the rack 35 if displaced, will immediately return to its normal position in the bearings.

The teeth of the rack 35 engage the gear wheel 42 which is rotatably mounted on the shaft 43 which in turn is mounted in bearings 44.

The disc 45 made of insulating material, also rotatably mounted on the shaft 43, carries a housing 46 which is in frictional engagement with the gear wheel 42. The housing 46 is provided with interior ratchets 47 over which rides the resilient pawl 48 mounted on the hub 49 of the gear wheel 42, when the gear wheel rotates in the direction indicated by the arrow in Figure 2.

The brushes 50, normally resting in notches 51 on the disc 45, are connected to the battery 14 and the indicator 16, respectively, by wires 15 and 17.

The operation of the device is as follows:—

During normal operation of the vehicle, the bevelled ends of the spring-press pawls 34 will slide over the rack 35, but when the engine is reversed the disc 33 will be caused to rotate in a direction opposite to the arrow in Figure 2, the pawls 34 will engage the notch 52 on the rack 35 and move it upwardly with regard to Figure 2, for a distance, against the tension of the retractile spring 41. The displacement of the toothed rack 35 will rotate the gear-wheel 42 together with the resilient pawl 48 while the disc 45 and the housing 46 will remain stationary by the brushes 50 engaging the notches 51.

As soon as the spring-press pawl 34 becomes disengaged from the notch 52 on the rack 35, the latter will snap back into its normal position. The gear wheel 42 will then rotate in the direction indicated by the arrow in Figure 2 and the pawl 48 will engage the ratchets 47 whereby the disc 45 will also be caused to rotate in the direction indicated by the arrow in Figure 2. This operation will in turn cause the brushes 50 to engage the contact elements 53 resulting in an intermittent closing and opening of the circuit. These electric impulses are transformed into light-signals by an electric bulb 54 mounted in a socket 56 in the indicator.

As shown in Figure 6, a horn 57 or similar sound device may also be attached to the indicator.

A colored glass 58 bearing the proper warning indicia may be placed in front of the illuminating bulb 54.

As shown in Figure 7, the signaling device may be hooked up in the conventional stop-light 59 operated by the brake switch 60. In this manner a separate indicator may be eliminated.

Although the foregoing detailed description relates merely to the examples illustrated in the drawing, it is obvious that other modifications may be made without departing from the spirit of the invention. It is equally obvious that the device may be used to indicate other directional movements than a backing movement without departing from the scope of the invention.

What is claimed is:

1. In a vehicle reverse motion indicating device of the type having a speedometer, including a speedometer shaft, the combination therewith of a switch mechanism inserted in the course of the speedometer shaft for alternately opening and closing said switch at short intervals upon the reverse movement of said vehicle, said switch mechanism comprising a shaft adapted to be connected to said speedometer shaft and rotated thereby, a reciprocable rack controlled by said shaft to displace the same in a longitudinal direction relative to its mounting upon reversal of rotation of the speedometer shaft, and separate means controlled by said rack for alternately making and breaking the circuit.

2. In a driven vehicle reverse motion indicating device of the type having a speedometer including a speedometer shaft composed of a plurality of links operated by the drive shaft of the engine, the combination therewith of a switch mechanism inserted between the links of the speedometer shaft for alternately opening and closing said switch at short intervals upon the reversed movement of said vehicle, said switch mechanism comprising a shaft adapted to be connected to said links and driven thereby, a reciprocable rack mounted adjacent said shaft, means connected with said shaft for displacing said rack in a longitudinal direction relative to its mounting upon reversal of rotation of the speedometer shaft and separate means engaging said rack for alternately making and breaking said circuit.

3. In a driven vehicle reverse motion indicating device of the type having a speedometer including a speedometer shaft composed of a plurality of links, the combination therewith of a switch mechanism for alternately opening and closing said circuit at short intervals upon the reversal of the movement of said vehicle, said switch mechanism comprising a shaft to be connected to said links and driven thereby, a reciprocable rack mounted adjacent said shaft, means connected with said shaft for displacing said rack in a longitudinal direction relative to its mounting upon the reversal of the rotation of the shaft, a gear wheel engaging said rack whereby the former will rotate when the latter is displaced, an insulated disc provided with contact elements rotatably mounted laterally of said gear wheel and independently thereof, whereby said disc will remain stationary when said gear wheel is rotated, means connected with said gear wheel for engaging said disc upon the reversed rotation of said gear wheel, and a plurality of brushes engaging said disc and connected to said circuit.

HAKON GILBERT.